United States Patent [19]

Keiser

[11] Patent Number: 4,828,347
[45] Date of Patent: May 9, 1989

[54] OSCILLATING LINEAR DEFLECTION DEVICE

[76] Inventor: Heinz Keiser, Obere Aegerten 12, CH-8143 Stallikon, Switzerland

[21] Appl. No.: 37,310

[22] Filed: Apr. 13, 1987

[30] Foreign Application Priority Data

Apr. 11, 1986 [CH] Switzerland ............... 1435/86

[51] Int. Cl.$^4$ ............ G02B 26/10; G02B 26/08; H01F 7/00
[52] U.S. Cl. ................. 350/6.6; 350/484; 350/DIG. 3; 335/229
[58] Field of Search .......... 350/6.6, 6.5, 6.1, DIG. 3, 350/484; 335/209, 219, 220, 221, 229; 318/119, 120, 443

[56] References Cited

U.S. PATENT DOCUMENTS

| | | | |
|---|---|---|---|
| 4,073,567 | 2/1978 | Lakerveld et al. | 350/6.5 |
| 4,135,119 | 1/1979 | Brosens | 350/6.1 |
| 4,596,970 | 6/1986 | Vanderlaan et al. | 335/229 |
| 4,600,910 | 7/1986 | Vanderlaan | 335/229 |

*Primary Examiner*—John K. Corbin
*Assistant Examiner*—Ronald M. Kachmarik
*Attorney, Agent, or Firm*—Browdy & Neimark

[57] ABSTRACT

A drive with a D.C. motor is provided for the oscillating deflection of a mirror for the line by line scanning of pictures. It is supplied with alternating current so that the rotor executes a harmonic oscillation. To fix the zero position or the oscillation mean position, a magnet with an outwardly oriented magnetic pole is fixed to the mirror carrier. Another magnet is fixedly disposed on the housing thus that a reciprocal pole to the pole on the mirror carrier is opposite to it. Thus it is not necessary to overcome a force increasing proportionally to the deflection which also would interfere with the oscillation, as in the known zero position by means of a torsion bar.

7 Claims, 1 Drawing Sheet

4,828,347

OSCILLATING LINEAR DEFLECTION DEVICE

FIELD OF THE INVENTION

The present invention relates to an oscillating linear deflection device wherein a beam deviation element is moved by means of an oscillating electromechanical drive.

BACKGROUND OF THE INVENTION

It is known, for example for the scanning of pictures during television broadcast or for the coding and storing of information, from Swiss application No. CH-A-468 135 to scan the picture line by line. For this purpose a light beam is oscillatingly deviated by means of a pivotable mirror and moved across the picture, where the light beam is modulated and reflected so that the differences in brightness can be transformed into analog electrical signals.

An exemplary embodiment for the drive of such a mirror is described in U.S. Pat. No. 3,624,574. In it a soft iron bar is exposed to a polarizing magnetic field of two permanent magnets diametrically opposed to each other with respect to a pivotal axis. In the orthogonal direction to this magnetic field a controlling magnetic field, consisting of two also diametrically opposed magnetic coils, is provided. The soft iron bar, having its longitudinal axis along the pivot axis, is rigidly connected at one end with a torsion bar and carries the mirror for the beam deviation. The torsion bar, clamped on one end, determines the central position for the mirror, namely in its non-pivoted normal position or in a position slightly deflected by the polarizing magnetic field.

Such an arrangement has the disadvantage that an additional mass must be moved, whereby in this mass additional energy is taken from the drive and transformed into heat, namely by the torsional force. In addition to this, the torsion bar needs to have a minimal final length which provides sufficient deflection, or the mirror must be far enough away from the picture to be scanned so that because of this distance sufficient deflection can be obtained. Both are values by means of which a device can be disadvantageously increased in size.

SUMMARY OF THE INVENTION

It is therefore an object of the invention to provide a deflection device in which the zero adjustment is performed without mechanical means and where the limitation of the deflection angle is determined by the drive and not by a restoring force which increases proportionally to the deflection angle.

In the invention this zero adjustment is accomplished by a magnetic system wherein a first magnet is fixed in place and a second magnet is fastened on the electromechanical drive, the magnets being different in polarity from each other.

The exemplary embodiments of the invention are described below.

Figure 1:
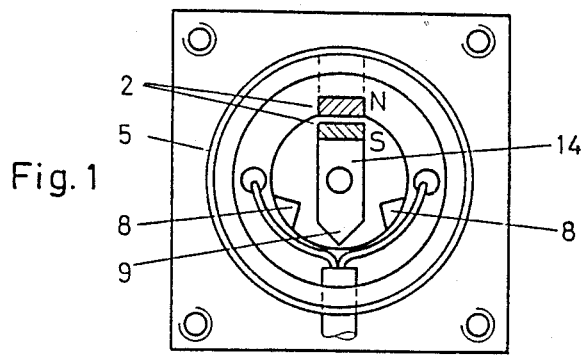
FIG. 1 is a top view of a first embodiment of a deflection device seen from the direction of the line I—I of FIG. 2.
Figure 2:
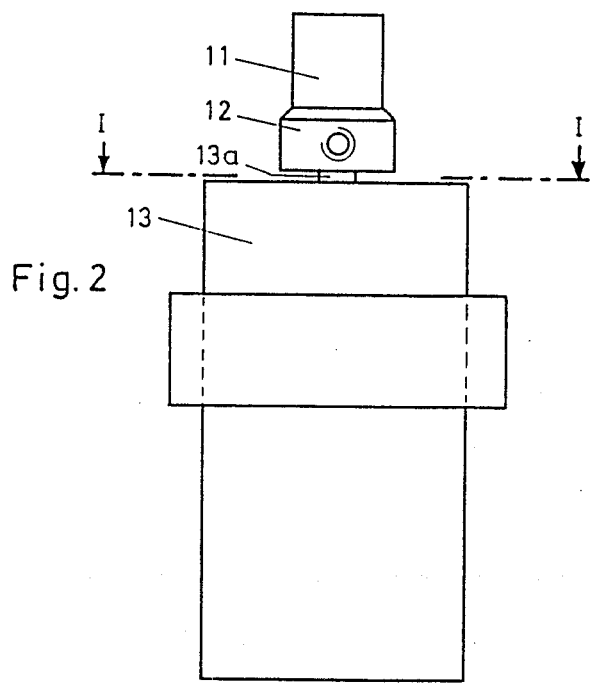
FIG. 2 is a front elevation of the deflection device.

Basically, the deflection device consists of a D.C. motor 13 which, supplied with alternating current, performs an harmonic oscillation synchronous with the frequency of the alternating current. A mirror support 12 is fixed on the drive shaft 13a of the D.C. motor 13, on which a mirror 11 is fixed axially to the shaft 13a. A carrier 9, extending in a diagonal direction on both sides of the shaft 13a, is located underneath the mirror support 12. On the one side a permanent magnet 2, for example a samarium-cobalt magnet, is fastened in accordance with FIG. 1 such that its south pole S points radially outward. At a point on the periphery of the housing 5 is disposed another permanent magnet 2 for example of the same material, pointing with its north pole N radially inwards, i.e. lies opposite the south pole S on the carrier 9. This results in a magnetic attraction between the two poles N and S and the carrier always returns into this predetermined position without application of an exterior force.

Therefore the D.C. motor 13, except for the acceleration force for the total mass to be moved, only needs to overcome the magnetic attraction of these two magnets in the zero position or the center position, which becomes smaller at greater distance, anyway.

To prevent that the rotor overshoots or even starts to rotate, two final stops 8 are provided against which the carrier strikes with the end part opposite the magnet 2, should the deflection angle become too large.

Figure 3:
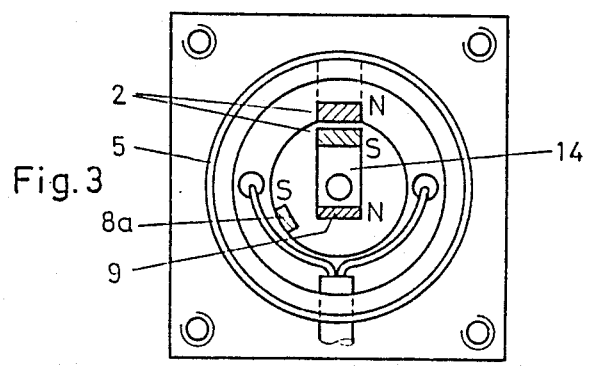
FIG. 3 is a top view, similar to FIG. 1, of a further embodiment of a deflection device.

A variation is shown in FIG. 3. Here the stops 8 have been replaced by at least one permanent magnet 8a. If the carrier consists of magnetic material or is ferromagnetic over its entire length, the reciprocal pole N on carrier 9 opposite to the said magnetic pole S thereon can be pointed radially to the outside. At at least one place of the periphery, for example orthogonal to the zero position of the carrier, another magnet could be disposed with its north pole N so that a repulsive force is created. Thus the carrier 9 cannot perform a rotation of 360° and start to rotate.

I claim:

1. An oscillating linear deflection device for a laser beam in which a beam deviation element is moved by means of an oscillating electromechanical drive comprising
    an electromagnetic drive with a housing including
        a drive shaft;
        and a carrier mounted for movement with said drive shaft;
    a magnetic system for the fixing of a zero position including
        a first magnet fixed in place,
        and a second magnet fastened to said carrier,
    said first magnet having a polarity different from the polarity of said second magnet,
    a mirror supported with said second magnet by said carrier;
    and mechanical stops fixedly disposed on said housing to limit the pivot angle of said carrier.

2. The oscillating linear deflection device of claim 1 wherein
    said electromagnetic drive is a D.C. motor supplied with alternating current;
    said motor being located in said housing and having a rotor attached to said drive shaft.

3. The oscillating linear deflection device of claim 1 wherein said first and second magnets are permanent magnets.

4. An oscillating linear deflection device for a laser beam in which a beam deviation element is moved by means of an oscillating electromechanical drive comprising
- an electromagnetic drive with a housing including
  - a drive shaft,
    - said electromagnetic drive being a D.C. motor supplied with alternating current,
    - said motor being located in said housing and having a rotor attached to said drive shaft,
  - and a carrier mounted for movement with said drive shaft;
- a magnetic system for the fixing of a zero position including
  - a first magnet fixed in place,
  - and a second magnet fastened to said carrier,
  - said first magnet having a polarity different from the polarity of said second magnet;
- a beam deviation element supported along with said second magnet by said carrier.

5. The oscillating linear deflection device of claim 4 wherein
said first and second magnets are permanent magnets.

6. The oscillating linear deflection device of claim 4 wherein
a third magnet is fixedly fastened to said housing;
said third magnet having the same polarity as said second magnet.

7. The oscillating linear deflection device of claim 6 wherein
a fourth magnet is disposed orthogonal to a zero position of said carrier having a polarity opposite to the polarity of said third magnet to create a repulsive force to said third magnet.

* * * * *